US008670717B2

(12) United States Patent
van Rensburg et al.

(10) Patent No.: US 8,670,717 B2
(45) Date of Patent: Mar. 11, 2014

(54) SYSTEM AND METHOD FOR ENABLING COORDINATED BEAM SWITCHING AND SCHEDULING

(75) Inventors: Cornelius van Rensburg, Wylie, TX (US); Patrick Ahamad Hosein, San Diego, CA (US); Anthony C. K. Soong, Plano, TX (US)

(73) Assignee: FutureWei Technologies, Inc., Plano, TX (US)

( * ) Notice: Subject to any disclaimer, the term of this patent is extended or adjusted under 35 U.S.C. 154(b) by 944 days.

(21) Appl. No.: 12/626,401

(22) Filed: Nov. 25, 2009

(65) Prior Publication Data

US 2010/0127931 A1     May 27, 2010

Related U.S. Application Data

(60) Provisional application No. 61/118,474, filed on Nov. 27, 2008.

(51) Int. Cl.
    *H04B 1/00*         (2006.01)
(52) U.S. Cl.
    USPC ..................................................... 455/63.1
(58) Field of Classification Search
    USPC ........ 455/63.4, 562.1, 73; 370/338, 352, 280; 375/267; 342/374, 383; 343/833, 834
    See application file for complete search history.

(56) References Cited

U.S. PATENT DOCUMENTS

| 7,274,330 | B2 * | 9/2007 | Lee | 342/374 |
| 7,373,176 | B2 * | 5/2008 | Chotkowski et al. | 455/562.1 |
| 2004/0224637 | A1 * | 11/2004 | Silva et al. | 455/63.4 |
| 2006/0035608 | A1 | 2/2006 | Zhang et al. | |
| 2006/0203789 | A1 * | 9/2006 | Iacono et al. | 370/338 |
| 2007/0195908 | A1 * | 8/2007 | Attar et al. | 375/267 |
| 2007/0218950 | A1 | 9/2007 | Codreanu et al. | |
| 2008/0020715 | A1 * | 1/2008 | Zangi et al. | 455/73 |
| 2009/0253387 | A1 | 10/2009 | Van Rensburg et al. | |

FOREIGN PATENT DOCUMENTS

| CN | 101174870 A | 5/2008 |
| GB | 2 433 176 A | 6/2007 |
| JP | 2004 215171 A | 7/2004 |
| WO | WO 2008/011320 A2 | 1/2008 |
| WO | WO 2008/046845 A2 | 4/2008 |

OTHER PUBLICATIONS

Fujishima, K., et al., "Technical Proposal for IMT-Advanced," REV-080009, 3GPP TSG RAN IMT-Advanced Workshop, Apr. 7-8, 2008, 24 pages, Hitachi, Ltd., Shenzhen, China.

(Continued)

*Primary Examiner* — April G Gonzales
(74) *Attorney, Agent, or Firm* — Slater & Matsil, L.L.P.

(57) ABSTRACT

A system and method for enabling coordinated beam switching scheduling and switching is provided. A method for controller operation includes selecting beams for transmission in a beam cycle pattern, transmitting the selected beams in the beam cycle pattern, scheduling a subset of the plurality of communications nodes based on received transmissions for the subset of communications nodes and channel information reports from the plurality of communications nodes, and transmitting the received transmissions to the scheduled subset of the plurality of communications nodes. The selecting is based on measurements of received signal power to noise made by a plurality of communications nodes, and the channel information reports are based on measurements of received signal power plus received interference power to noise made by each of the plurality of communications nodes.

30 Claims, 6 Drawing Sheets

(56) References Cited

OTHER PUBLICATIONS

"Schedule Single vs. Multiple Beams Per Frame for E-UTRA," 3GPP TSG RAN WG1 Meeting #46, R1-062282, Discussion, Aug. 28-Sep. 1, 2006, 5 pages, Ericsson, Tallin, Estonia.
Saur, S., et al., "Grid-of-Beam (GoB) Based Downlink Multi-User MIMO," IEEE 802.16 Broadband Wireless Access Working Group, May 5, 2008, pp. 1-4, Alcatel-Lucent Bell Labs, Germany.
"LTE-Advanced—Coordinated Mulitpoint Transmission/Reception," TSG RAN WG1 #53bis, R1-082469, Discussion, Jun. 30-Jul. 4, 2008, 6 pages, Ericsson, Warsaw, Poland.
"Proposal for LTE-Advanced Technologies," 3GPP TSG RAN WG1 Meeting #53bis, R1-0825, Discussion, Jun.30-Jul. 4, 2008, pp. 1-36. NTT DoCoMO, Inc., Warsaw, Poland.
"DL Coordinated Beam Switching for Interference Management in LTE-Advanced," 3GPP TSG RAN WG1 #54, R1-083236, Discussion, Aug. 18-22, 2008, 6 pages, Huawei, Jeju, Korea.
"Inter-Cell Interference Mitigation Through Limited Coordination," 3GPP TSG RAN WG1 Meeting #54, R1-082886, Discussion and Decision, Aug. 18-22, 2008, 8 pages, Samsung, Jeju, Korea.
"International Search Report and Written Opinion," International Application No. PCT/CN2009/075175, Applicant: Huawei Technologies Co., Ltd., et al., mailing date: Mar. 11, 2010, 5 pages.
"Written Opinion of the International Searching Authority," International Application No. PCT/CN2009/075175, Applicant: Huawei Technologies Co., Ltd., et al., mailing date: Mar. 11, 2010, 3 pages.
"Extended European Search Report," International Application No. PCT/CN2009/075175, Applicant: Huawei Technologies Co., Ltd., et al., mailing date: Jun. 15, 2012, 12 pages.
Notice of Reasons for Rejection and Translation received in Japanese Application No. 2011-537833, dated Oct. 2, 2012, 6 pages.
X Huawei, "DL Coordinated Beam Switching for Interference Management in LTE-Advanced," 3GPP TSG RAN WG1#54bis, R1-083710, Prague, Czech Republic, Sep. 29-Oct. 3, 2008, 7 pages.

\* cited by examiner

SYSTEM AND METHOD FOR ENABLING COORDINATED BEAM SWITCHING AND SCHEDULING

This application claims the benefit of U.S. Provisional Application No. 61/118,474, filed on Nov. 27, 2008, entitled "Scheduling Method to Enable Coordinated Beam Switching and Scheduling in an LTE Cellular System," which application is hereby incorporated herein by reference.

TECHNICAL FIELD

The present invention relates generally to wireless communications, and more particularly to a system and method for enabling coordinated beam switching scheduling and switching.

BACKGROUND

In general, wireless communications systems using beamforming makes use of a number of transmit and/or receive antennas and signal processing to create fixed or adaptive transmit/receive beam patterns. The beam patterns may have a directional nature that may result in a performance improvement when compared with unidirectional transmit and/or receive antennas. The use of the beam patterns may yield a transmit/receive gain over wireless communications systems using unidirectional transmit and/or receive antennas.

As such, beamforming has been promoted as a promising technique to increase cell coverage and to improve cell edge spectral efficiencies. However, one main drawback of beamforming is the so called flashlight effect where the channel quality changes between user equipment (UE) measurement and reporting, and NodeB (NB) transmission, due to the changes in the beam pattern of the interfering neighbouring cells.

Other commonly used and typically interchangeable terms for UE may include mobile station, user, terminal, access terminal, subscriber, and so forth, while controller, base station, enhanced NodeB, base terminal station, and so on, may be commonly used terms for NB.

Coordinated beamforming/switching has been suggested as a possible solution to this problem (see C80216m-08_487, Alcatel_Lucent, "Grid-of-Beams (GoB) Based Downlink Multi-User MIMO", IEEE802.16m, May 2008; and NTT DoCoMo, "Proposals for LTE-Advanced technologies", R1-082575, Warsaw, Poland, Jun. 30-Jul. 4, 2008;").

During the development of Long Term Evolution (LTE), there was much discussion for the flexibility to customize LTE to maximize performance in specific environments. Also, during discussions of LTE-Advanced (LTE-A), many suggestions were made to manage interference level by using coordinated transmissions from different cells (see Ericsson, R1-082469, "LTE-Advanced—Coordinated Multipoint transmission/reception", Warsaw, Poland, Jun. 30-Jul. 4, 2008"). It is well known that as cell size is decreased in an effort to improve spectral efficiency, interference increases.

SUMMARY OF THE INVENTION

These and other problems are generally solved or circumvented, and technical advantages are generally achieved, by embodiments of a system and method for enabling coordinated beam switching scheduling and switching.

In accordance with an embodiment, a method for controller operation is provided. The method includes selecting beams for transmission in a beam cycle pattern, transmitting the selected beams in the beam cycle pattern, scheduling a subset of the plurality of communications nodes based on received transmissions for the subset of communications nodes and channel information reports from the plurality of communications nodes, and transmitting the received transmissions to the scheduled subset of the plurality of communications nodes. The selecting is based on measurements of received signal power to noise made by a plurality of communications nodes, and the channel information reports are based on measurements of received signal power plus received interference power to noise made by each of the plurality of communications nodes.

In accordance with another embodiment, a method for communications node operation is provided. The method includes measuring a communications channel between the communications node and a controller serving the communications node over a number of transmission units, thereby producing a first plurality of measurements, selecting a first preferred measurement from the first plurality of measurements, sending information related to the first preferred measurement to the controller, measuring the communications channel over the number of transmission units, thereby producing a second plurality of measurements, selecting a second preferred measurement from the second plurality of measurements, sending information related to the second preferred measurement to the controller, and receiving a transmission from the controller during a transmission unit corresponding to the second preferred measurement. Transmissions from the controller are beamformed using a plurality of beam patterns, a beam pattern used in beamforming the transmissions are changed once per transmission unit, and transmissions from the controller are beamformed using a periodic beam cycle pattern.

In accordance with another embodiment, a communications system is provided. The communications system includes a plurality of controllers, and a central controller coupled to the plurality of controllers. An inuse subset of the controllers is wirelessly coupled to at least one communications device in a plurality of communications devices, and a subset of the plurality of controllers is operating in a cooperative beam switching mode (CBSM). Each of the controllers operating in the CBSM selects beams for transmission in a beam cycle pattern based on first measurements from the plurality of communications nodes, transmits the selected beams in the beam cycle pattern, and schedules transmissions to a subset of communications nodes based on received transmissions for the subset of communications nodes and on channel information reports from the communications nodes. The central controller determines a period of the beam cycle pattern for each controller.

An advantage of an embodiment is that beams to be used in a beam cycling pattern may be allocated based on actual UE population rather than expected UE population. Therefore, the performance of the communications system may be tailored to actual conditions.

A further advantage of an embodiment is that beams allocated for use in a beam cycling pattern may be removed or otherwise adjusted if they are subject to significant interference which makes them undesirable for use. Removing or adjusting the undesirable beams may free up bandwidth for other beams that may better serve the UE population.

Yet another advantage of an embodiment is that the UE does not need knowledge of interfering cells. This may reduce the amount of measurements that the UE needs to perform as well as the amount of information that the UE has to report to its serving eNB.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless communications system with NodeBs (NB) using beamforming to transmit to User Equipment (UE) using directional beam patterns, where the transmissions of the NBs may be synchronized with one another. The invention may be applied to wireless communications systems using a wide range of wireless access technologies, such as LTE, LTE-Advanced, and so forth. Additionally, the invention may also be applied to NBs using non-directional beam patterns.

Figure 1:
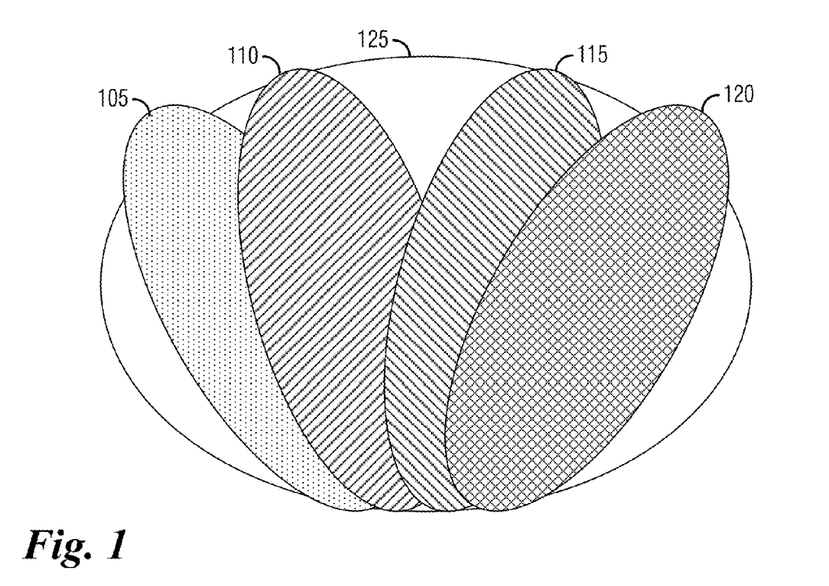
FIG. 1 is a diagram of possible antenna beams from a plurality of antennas.

FIG. 1 illustrates possible antenna beams from a plurality of antennas. As shown in FIG. 1, there are four directional antenna beams, such as directional antenna beam "BEAM 1" 105, directional antenna beam "BEAM 2" 110, directional antenna beam "BEAM 3" 115, and directional antenna beam "BEAM 4" 120, corresponding to different transmission antennas. FIG. 1 also illustrates an omnidirectional beam 125 that may correspond to the use of all antennas in the plurality of antennas to transmit the signal to be transmitted.

Figure 2A:
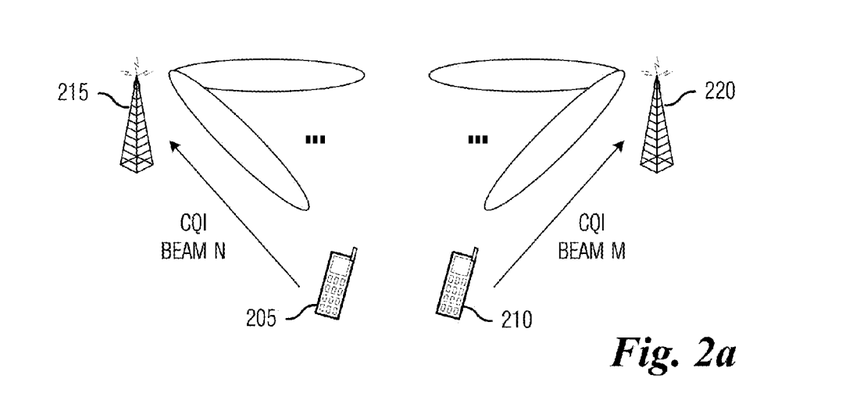
FIG. 2a is a diagram of the operation of two UEs in two adjacent cells.

FIG. 2a illustrates the operation of two UEs in two adjacent cells. A first UE "UE1" 205 may measure transmissions from a first NB "NB1" 215 and a second UE "UE2" 210 may measure transmissions from a second NB "NB2" 220 to determine the best CQI, which it may report back to its respective NB. The transmissions made by the NBs may be made with different antenna beams at different times. Then, transmissions to the UEs may be made using the slot corresponding to the best CQI reported to the NBs by the UEs.

Cell coordination may occur at many levels. At the highest level, a central scheduler has full knowledge of all radio conditions of all UE's in a cluster of cells and tries to find a global optimum selection of UE's to be served at any instant in time.

A solution proposed in co-assigned patent application Ser. No. 61/172,622, filed Apr. 24, 2009 makes use of a new beamforming mode, referred to as coordinated beam switching mode. In coordinated beam switching, every NB would determine its own cycling pattern, based on a predefined pattern based on its load and user distribution and then communicate this cycling pattern over a backhaul to other NBs in the cluster. This cycling pattern does not need to be communicated to the UEs, only the cycling pattern's period. The coordinated beam switching mode implies that:

The reference signal (RS) on Antenna port 5 is always switched on.

A UE measures CQI based on Antenna port 5.

The NBs in a cluster taking part in the coordination agree and broadcast the period of the beam cycling pattern. For example, a NB with eight (8) antennas may choose a period of eight (8), while a NB with four (4) antennas may select a period of four (4). The cluster period will be determined either by a cluster controller or some function of the reported cell periods such as greatest reported period, namely eight (8).

A cluster controller determines, based on the reported cycling periods, an optimum cycling period and reports this period back to the individual NBs. The NBs then have to adjust their preferred cycling period to the cluster controller period and broadcast this period to the UEs in the cells.

In another embodiment, the period is determined by a technical standard or is otherwise prespecified and each NB determines its beam cycling pattern accordingly, and the period does not need to be broadcasted since the UEs will already know this value from the technical standard or from the prespecified value.

The UE reports the subframe where the maximum CQI was measured in the period, and reports one CQI per period.

According to the LTE technical standards, antenna port five (5) is configured as a UE specific RS which is only switched on during data transmission on the physical downlink shared channel (PDSCH). The proposed solution has a mode wherein antenna port five (5) is configured as a cell specific RS which is permanently switched on during this mode. The proposed use of antenna port five (5) as a common RS is such that if all NBs in a cluster cycled through a set of predefined beams over a specific period of a certain number of subframes where both the RS and PDSCH use the same beams. This may cause both a predictable beam and interference to a UE. Given that the UE will then measure the CQI directly from the cell specific RS on antenna port five (5), there may be no ambiguity about the CQI as is currently the case with the UE specific RS.

Advantages of the proposed solution include:

The UE does not need to perform a channel estimate on an interfering cell.

The UE does not need to report a preferred PMI nor a preferred interferer PMI.

The CQI calculated is a function of the complete interference environment, not only based on the strongest interferer.

The UE does not need to know the configuration of the other NBs in the cluster.

For example some NBs could have different numbers of antennas, and different configurations. Some NBs may not even participate in the coordination and the UE does not need to know that. If a neighboring NB has an uncorrelated antenna configuration, and does not operate in the coordinate beam switching mode (it may perform spatial multiplexing or transmit diversity), then the CQI will be a function of the data transmitted in the REs where the antenna port 5 RS would normally be.

In order to efficiently implement a coordinated beam switching system, a time-frequency beam allocation method may be used. LTE has an OFDMA signal structure on the downlink, which means that the there is a frequency domain component that may be exploited. Given that the current LTE reference may be able to do frequency domain subband scheduling (in addition to time domain subframe scheduling), and therefore obtain multi-user diversity gains on a subband level, similar gains need to be achieved with coordinated beam switching.

Furthermore, as discussed previously, the importance of selecting the shortest possible cycle length in order to reduce the scheduling delay must be stressed. Given that in OFDMA, it is possible to cycle in both time and frequency, there is more flexibility to choose longer cycle lengths (which are shorter in time) which may more accurately reflect the per beam loading, as well as provide the necessary interference diversity.

Additionally, a specific beam should be placed on a subband where the corresponding UEs have a frequency domain peak. Given a large UE pool, this is not crucial since in general, some UE will always be at a peak at every subband. However, in a low loading situation, this may be more important.

Figure 2B:
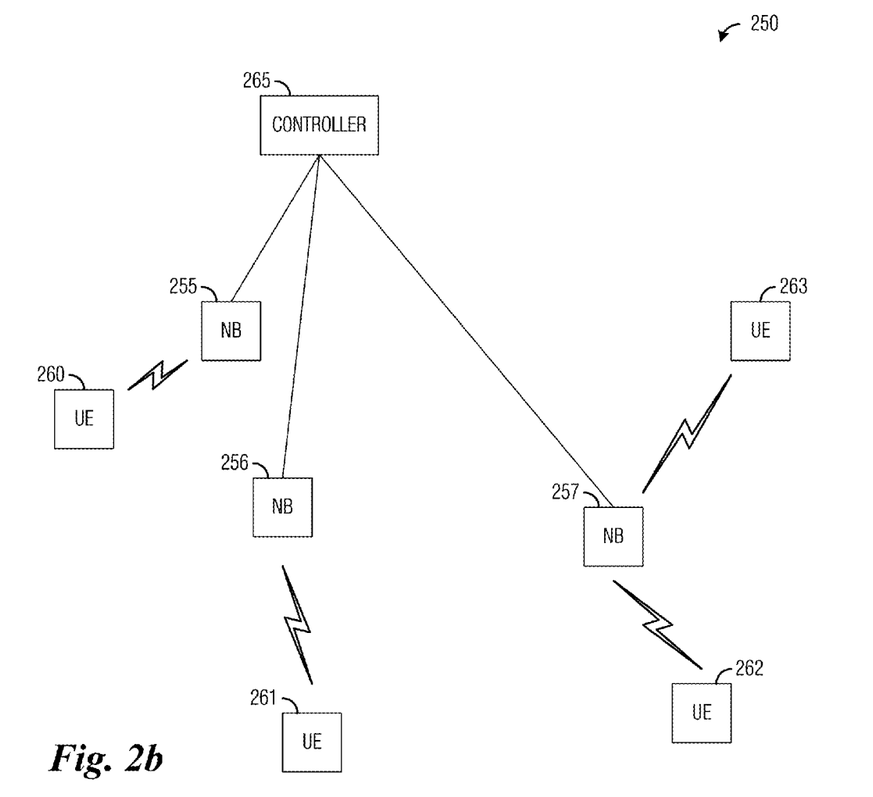
FIG. 2b is a diagram of a wireless communications system.

FIG. 2*b* illustrates a wireless communications system 250. Wireless communications system 250 includes a number of NBs, such as NB 255, NB 256, and NB 257. Each of the NBs may be responsible for allocating network resources to UEs, such as UE 260, UE 261, UE 262, and UE 263, that it is serving. For example, a NB may forward a transmission intended for a UE that it is serving or allocate some network resources to a UE that it is serving so that the UE may transmit information.

Some or all of the NBs in wireless communications system 250 may be operating in a coordinated beam switching mode. The NBs that are operating in a coordinated beam switching mode may be referred to as being in an inuse subset of all of the NBs since not all NBs are required to participate in coordinated beam switching mode. The NBs that are operating in a coordinated beam switching mode may each transmit cell specific RS beam formed with beams in a preferred set of beams. Each NB may have a different preferred set of beams. Each cell within a single NB may have a different preferred set of beams. Additionally, each NB or each cell may have a different number of beams in its preferred set of beams. Furthermore, a cycling pattern for each NB or each cell may be different in terms of period and/or pattern.

In a situation when not all of the NBs in wireless communications system 250 is operating in a coordinated beam switching mode, then if the NB has a neighboring NB that is not operating in a coordinated beam switching mode (for example, the neighboring NB may be operating in spatial multiplexing or transmit diversity modes), then the CQI measurements made by UEs of the NB may be impacted by transmissions made by the neighboring NB that occur at the same time and frequency as the cell specific RS transmitted by the NB.

Although each NB or each cell may have a beam cycling pattern with a different period, there may be a global beam cycling pattern period for all NBs operating in the coordinated beam switching mode. A controller 265 connected to the NBs may specify the global beam cycling pattern period based on individual beam cycling pattern periods from each of the NBs or cells. The global beam cycling pattern period may be a smallest multiple of all of the individual cycling pattern periods. For example, if three NBs are participating in the coordinated beam switching mode with individual beam cycling pattern periods of four (4), four (4), and eight (8), respectively, then the global beam cycling pattern period may be eight (8). Alternatively, the global beam cycling pattern period may be 16, 24, or so forth.

Figure 2C:
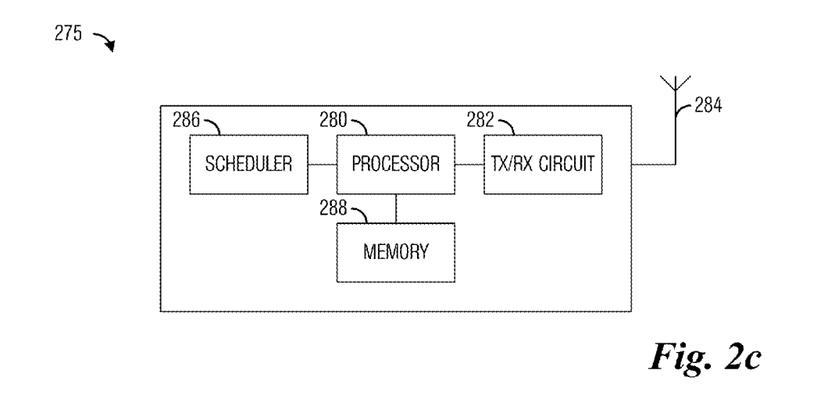
FIG. 2c is a diagram of a NB.

FIG. 2*c* illustrates a NB 275. NB 275 may control communications to and from UEs that it is serving. NB 275 may operate in several operating modes, including coordinated beam switching. NB 275 includes a processor 280 that may be used to run applications and programs. NB 275 also includes a transmit/receive circuit 282 that may be used to process information/data to be transmitted as well as process received information/data. For example, transmit/receive circuit 282 may filter, amplify, error detect, error correct, encode, decode, and so forth, the information/data. The information/data may be received or transmitted by way of an antenna 284. Although shown as a single antenna, antenna 284 may be an antenna array of multiple antennas.

NB 275 further includes a scheduler 286 that may be used to schedule transmissions of information/data to UEs served by NB 275. Scheduler 286 may implement a two-stage scheduling algorithm wherein a first stage comprises a slow beam selection and a second stage comprises a fast user selection. Both scheduler 286 and processor 280 may be coupled together and to a memory 288. Memory 288 may be used to store applications and programs, as well as scheduling data, such as received communications channel reports from the UEs served by NB 275. Memory 288 may also be used to store information about which network resources have been assigned to which UEs, as well as beam cycle information, such as beam cycle period, beam cycle pattern, beams, codebooks, and so on.

Figure 3:
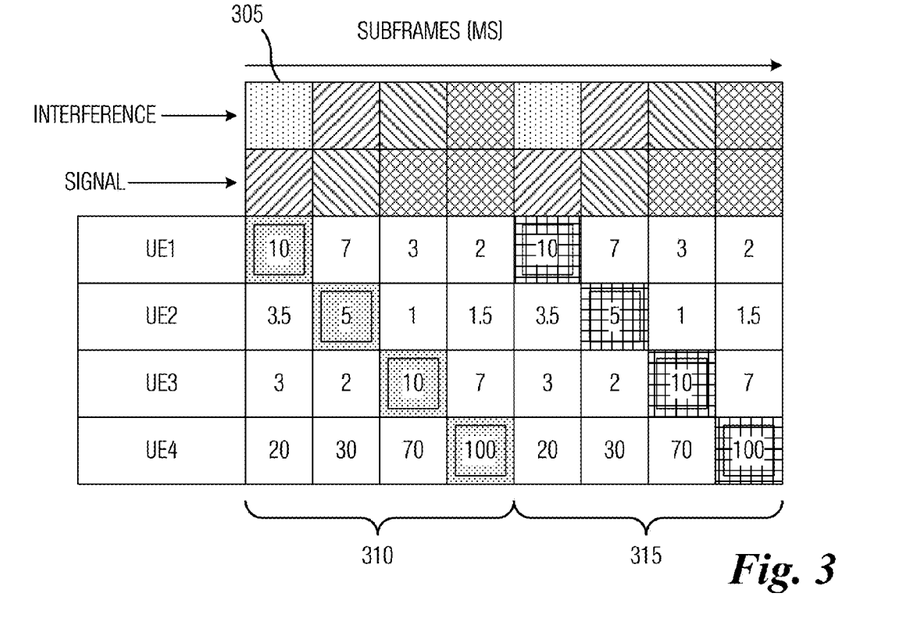
FIG. 3 is a diagram of CQI as reported by UEs.

FIG. 3 illustrates a diagram of CQI as reported by UEs. FIG. 3 also illustrates scheduling of subframes in the time domain. CQI, as reported by a number of UEs, is shown for different subframes. For example, at subframe 305, UE1 reported CQI of 10, while UE2 reported CQI of 3.5, UE3 reported CQI of 3, and UE4 reported CQI of 20. A maximum CQI for each UE is shown highlighted in shaded boxes with smaller sub-squares, with a maximum CQI for UE1, UE2, UE3, and UE4, being 10, 5, 10, and 100, respectively. Spans 310 and 315 highlight two beam cycles. Notice that subframes that yielded maximum CQI for each of the UEs in span 310 also produce maximum CQI for each of the UEs in span 315.

With coordinated beam switching, it may be possible to modify the purely time frequency domain scheduling shown in FIG. 3 into a time-frequency domain based scheduling by adding frequency domain based scheduling to the time domain based scheduling.

Figures 4, 5A:
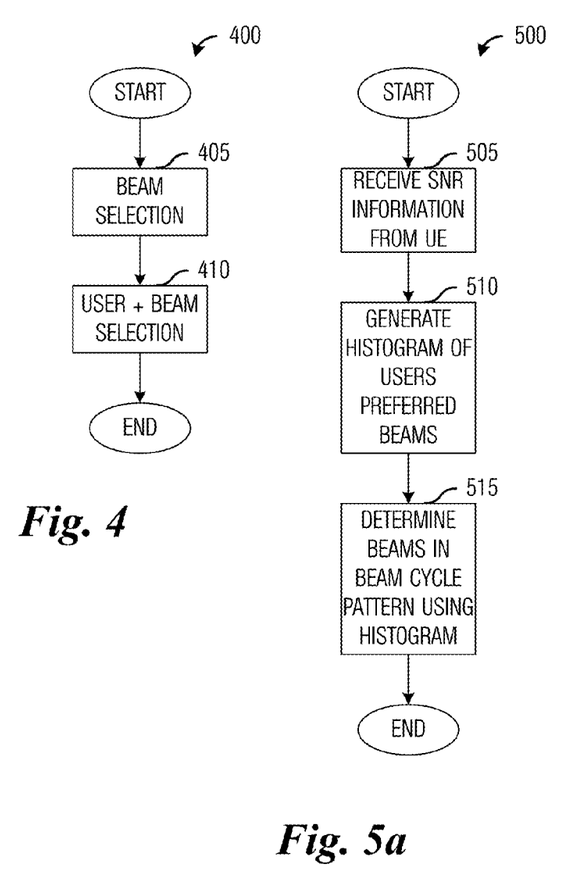
FIG. 4 is a flow diagram of a scheduler for UE scheduling.
FIG. 5a is a flow diagram of NB operations for first stage slow beam selection.

FIG. 4 illustrates a flow diagram of a scheduler 400 for UE scheduling. Scheduler 400 may be used to schedule transmissions to and from UE being served by a NB. Scheduler 400 may execute in the NB while the NB is in a normal operating mode.

Scheduler 400 may be a two-stage scheduler, with a first stage being a slow beam selection process that may be used to determine a beam cycling pattern for the NB given a predefined cycling period (block 405) and a second stage being a fast user selection process that may be used to determine which UE is scheduled in which time-frequency-beam resource (block 410). Both the first stage and the second stage may make use of information provided to the NB by the UEs being served by the NB.

FIG. 5a illustrates a flow diagram of NB operations 500 for first stage slow beam selection. NB operations 500 may be indicative of operations occurring in a NB as it selects beams for its beam cycle pattern to transmit during its beam cycle period. NB operations 500 may occur while the NB is operating in a normal operating mode.

An aim of a coordinated beam switching system may be to make an interference pattern cyclical and therefore predictable. This may imply that once the NB has decided which beams to use in its beam cycle period, it may not change its selected beams easily and may have to maintain the beams in the beam cycle period for an extended period of time (perhaps on the order of several seconds). A problem that may be associated with beam selection is the selection of a bad beam. A bad beam may be a beam that UEs may not select as a preferred beam in the future. Therefore, the bad beam effectively becomes a dead beam, i.e., a beam that must be present in the beam cycle period but one that no UE will select as a preferred beam, thus a timeslot may be wasted.

NB operations 500 may begin with the NB receiving signal to noise ratio (SNR) measurements from the UEs that it is serving (block 505). The UEs may measure its communications channel with the NB during the beam cycle period (while the NB is cycling through its beam cycle pattern). For example, the UEs may measure a received beamformed signal power, ignoring any interference power, and select a best beam b, where the best beam b may be the beam with the highest received beamformed signal power. It may be important that the UEs ignore the interference power since the NB prior to the beam cycle pattern is set and has no control over interference fluctuations (caused by transmissions from other NBs).

The NB may then generate a histogram of the SNR reported by the UEs (block 510). For example, the NB may maintain a vector NumUsers, wherein NumUsers(b) represents a count of the number of UEs that have selected beam b as its best beam. Additionally, the NB may also maintain a vector NumBeam, wherein NumBeam(b) represents a count of the number of times that beam b appears in the beam cycle pattern.

From the histogram of the SNR reported by the UEs (NumUsers), the NB may then determine the beams in its beam cycle pattern (block 515). According to an embodiment, the NB may select a beam for a time slot (or transmission unit) in its beam cycle pattern by selecting a beam b having a maximum number of users that has selected the beam b as its preferred beam divided by a count of the number of times that the beam b appears in the beam cycle pattern (as long as the count is not equal to zero). After the beam b has been selected for use in the beam cycle pattern, then the vector representing the count of the number of times that beam b appears in the beam cycle pattern (NumBeam(b)) may be incremented.

Expressed as pseudo-code, the determining of beams in a beam cycle pattern by the NB may be expressed as:

for counter=1 to beam cycle period BeamCycle
        (counter)=max_index (NumUser/NumBeam),
        NumBeam(BeamCycle(counter))=NumBeam
        (BeamCycle(counter))+1, where max_index(argument) returns a beam index corresponding to a beam having the most number of UEs, and BeamCycle is a vector representing the beam cycle pattern.

According to an alternative embodiment, it may be possible to sacrifice fairness to gain additional throughput. For example, the NB may allocate select beams for use in its beam cycle pattern that are selected as preferred beam for strong SNR UEs. Expressed as pseudo-code, the determining of beams in a beam cycle pattern by the NB may be expressed as:

for counter=1 to beam cycle period BeamCycle
        (counter)=max_index
        (NumUser*AVG_SNR_Beam/NumBeam), Num-
        Beam(BeamCycle(counter))=NumBeam(Beam-
        Cycle(counter))+1, where AVG_SNR_Beam is a vector of an average SNR of UEs for each beam. The UEs may report to the NB a beam that maximizes its SNR, i.e., the UE selects Beam=max_index (SNR), where SNR is a vector representing the SNR for each beam.

Generally, in a cell with uniformly distributed UEs, an initial beam pattern cycle may include a sequence of the possible beams, e.g., [1, 2, . . . , NumBeam]. In order to minimize the impact on interference from beam selection, it may be possible to sort the beams in the beam cycle pattern. NB operations 500 may then terminate.

According to another alternative embodiment, instead of reporting only its preferred beam, each UE may report all SNRs to the NB, i.e., for each beam in the beam cycle period, each UE reports a SNR for the beam. The NB may then select a beam for the UE based on an average SNR for all other reported SNRs. The reported SNRs for all beams from all UEs may be stored in ALL_SNR, a NumBeam×NumUE matrix of all reported SNRs. Then AVG_SNR_Beam may be expressed as:

AVG_SNR_Beam=sum_along_rows(ALL_SNR), and

Beam(UE)=max_index(AVG_SNR_Beam*SNR
        (UE)).

Preference may be given by the NB to beams with many other strong (high SNR) UEs.

Figure 5B:
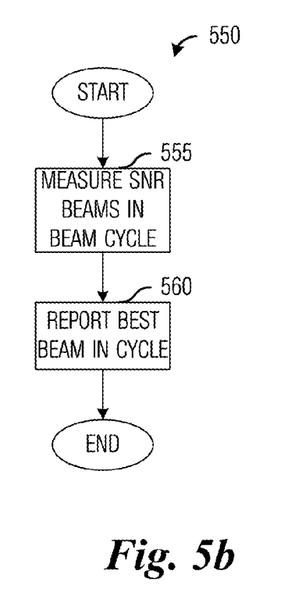
FIG. 5b is a flow diagram of UE operations for first stage slow beam selection.

FIG. 5b illustrates a flow diagram of UE operations 550 for first stage slow beam selection. UE operations 550 may be indicative of operations occurring in a UE served by a NB as the NB selects beams for its beam cycle pattern to transmit during its beam cycle period. UE operations 550 may occur while the UE is operating in a normal operating mode.

UE operations 550 may begin with the UE measuring a SNR of beams transmitted by the NB (block 555). The UE may simply measure a beamforming signal power without consideration given to any interference power. The UE may then select a best beam b that has the highest SNR and report the best beam b (or an index corresponding to the best beam b, for example, a time index of the beam cycle period) to the NB (block 560). UE operations 550 may then terminate.

According to an alternative embodiment, instead of reporting only the best beam, the UE may report a number of beams with the highest SNR. For example, the UE may report the two, three, or so forth highest SNR beams to the NB.

Figure 5C:
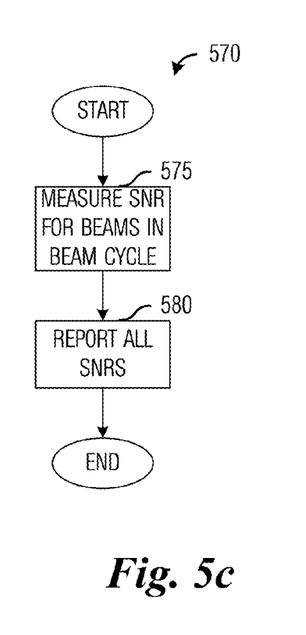
FIG. 5c illustrates a flow diagram of UE operations for first stage slow beam selection, wherein SNR are reported to the NB.

FIG. 5c illustrates a flow diagram of UE operations 570 for first stage slow beam selection, wherein SNR are reported to the NB. UE operations 570 may be indicative of operations occurring in a UE served by a NB as the NB selects beams for its beam cycle pattern to transmit during its beam cycle period. UE operations 570 may occur while the UE is operating in a normal operating mode.

UE operations 570 may begin with the UE measuring a SNR of beams transmitted by the NB (block 575). The UE may simply measure a beamforming signal power without consideration given to any interference power. The UE may then report all SNRs to the NB (block 580). UE operations 570 may then terminate.

Figure 6A:
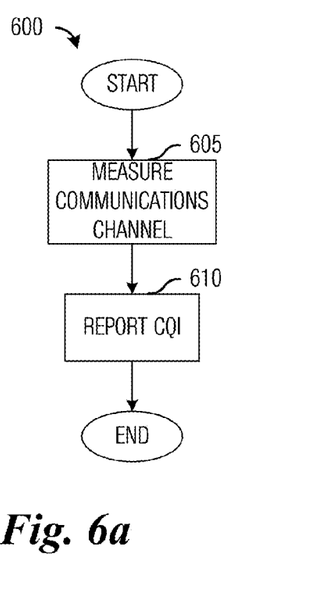
FIG. 6a is a flow diagram of UE operations for second stage fast user selection.

FIG. 6a illustrates a flow diagram of UE operations 600 for second stage fast user selection. UE operations 600 may be indicative of operations occurring in a UE served by a NB as the NB selects users to schedule transmission. UE operations 600 may occur while the UE is operating in a normal operating mode.

UE operations 600 may begin with the UE measuring a communications channel between the UE and the NB serving the UE (block 605). The UE may measure the communications channel for each of the different time slots (transmission units) in the beam cycle period and then select a preferred time slot, which corresponds to a preferred beam. The UE may then report a channel quality indication (CQI) to the NB (block 610). The CQI may be based on both the received transmit power and received interferer power (if any). For example, the UE may measure a signal and interference to noise ratio (SINR) and compute a CQI for reporting based on the SINR. Since the beam cycle patterns of the NBs may already be specified during the first stage slow beam selection, the interference to a UE may now be regular and predictable. Therefore, the UE may consider the received interference power in its channel measurements and preferred beam selection. The CQI report to the NB may have an equivalent overhead as reporting a preferred precoding vector every cycle period. UE operations 600 may then terminate.

According to a preferred embodiment, the UE may report the CQI along with information that will allow the NB to determine the beam and time slot of when the beam was transmitted. For example, the UE may transmit a time index corresponding to a time slot of the preferred beam. Since it may be possible that the preferred beam be transmitted at multiple time slots within the beam cycle period, information related to simply the preferred beam may not be sufficient to allow the NB to determine the beam and time slot.

According to another preferred embodiment, instead of reporting only information related to a single preferred beam back to the NB, the UE may report information related to the preferred beam along with information related to one or more additional beams, wherein the additional beams are also top quality beams with high SNR measurements. For example, the UE may report information related to m+1 beams, wherein the preferred beam may correspond to a beam with the highest SNR measurement and m additional beams may correspond to m beams with the next highest SNR measurements.

Figure 6B:
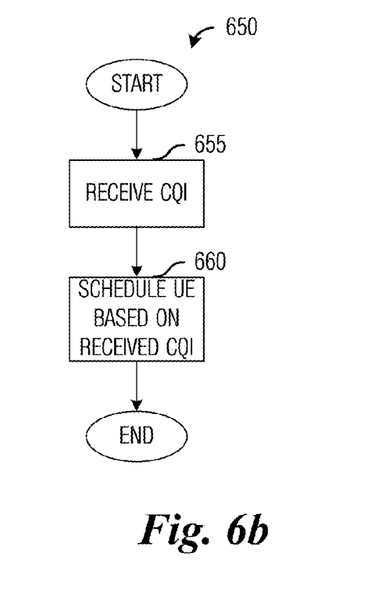
FIG. 6b is a flow diagram of NB operations for second stage fast user selection.

FIG. 6b illustrates a flow diagram of NB operations 650 for second stage fast user selection. NB operations 650 may be indicative of operations occurring in a NB as it selects UE to serve. NB operations 650 may occur while the NB is operating in a normal operating mode.

NB operations 650 may begin with the NB receiving CQI reports from the UEs that it is serving (block 655). As discussed previously, the CQI reports from the UEs may include information related to each UE's preferred beam along with additional information that may assist the NB in determining a time slot corresponding to the preferred beam. Alternatively, the CQI reports may contain information related to several beams, such as a preferred beam and one or two substitutes instead of a single preferred beam.

If the UE reports more than one CQI, the NB may need to be aware so that it does not schedule the UE to a beam that is not the UE's preferred beam if there are resources available on the UE's preferred beam. By doing so, the NB may prevent the UE from being scheduled on the UE's preferred beam and may prevent the communications system from reaching a global maximum throughput. The NB may only schedule a UE to a beam that is not the UE's preferred beam only when resources on the UE's preferred beam is inadequate to achieve multi-user diversity gain.

The NB may then schedule UEs based on the received CQI reports (block 660). For example, the NB may schedule a UE from an available pool of UEs that reported CQI information to a time slot/beam over all available network resources according to a scheduling technique, such as round robin, maximum throughput, proportional fair, or so on. Given frequency selective channels, it may be reasonable for the NB to select UEs in different frequency bins so that multi-user diversity gains may be achieved. In order to maximize multi-user diversity gains, it may be important for the NB to collect as many CQI reports per beam as possible.

Since it may be possible for the NB to transmit one beam multiple times within a single beam cycle period, it is important that the UE indicate which instance of the beam is its preferred beam since the interference environment may differ for the different times that the beam is transmitted. For example, if the beam is transmitted during time slots A and B, but during time slot B, a neighboring cell is transmitting a beam directly at a UE. Then, even if the UE reports that the beam is its preferred beam, without information regarding which time slot (A or B) is the preferred time slot, the NB may schedule the UE for time slot B, which is the worse interference environment. NB operations 650 may then terminate.

In the communications system discussed herein, each beam may be held constant for a frequency period and then changed between scheduling time periods, i.e., a beam is transmitted by a NB for the entirety of a time slot and the NB only changes beams on a time slot basis. However, it may also be possible for the NB to switch between beams in the frequency domain and hold them constant in the time domain. It may also be possible for the NB to use a combination of both frequency domain and time domain beam switching.

Figure 7A:
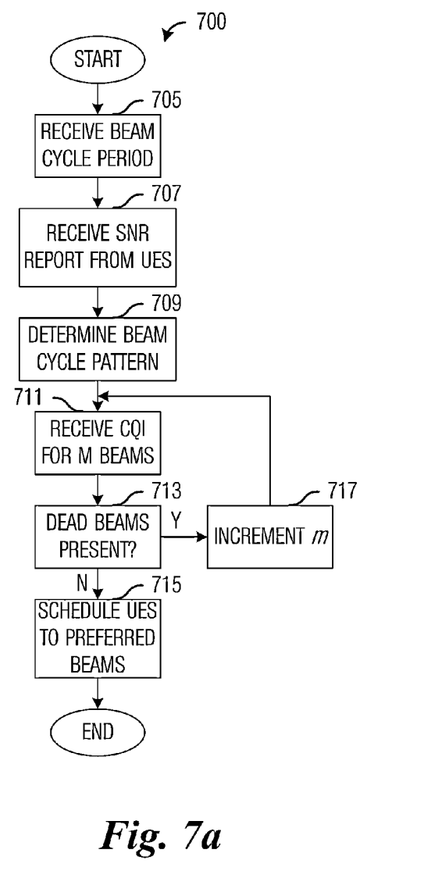
FIG. 7a is a flow diagram of NB operations for UE scheduling.

FIG. 7a illustrates a flow diagram of NB operations 700 for UE scheduling. NB operations 700 may be indicative of operations occurring in a NB as it schedules UEs using a two-stage scheduler. NB operations 700 may occur while the NB is operating in a normal operating mode.

NB operations 700 may begin with the NB receiving a beam cycle period from a controller, such as a cluster controller that may be used to control operations of NBs participating in coordinated beam switching (block 705). The beam cycle period may be a period of a beam cycle pattern of beams to be transmitted by the NB. Each NB participating in coordinated beam switching may have a beam cycle pattern of the same beam cycle period. However, the beams transmitted by the individual NBs and an ordering of the beams themselves may differ between the individual NBs.

Once the NB receives the beam cycle period from the cluster controller, the NB may begin to transmit its beams. For example, the NB may cycle through its available beams, perhaps in a random pattern or in sequence. The NB may then begin to receive SNR reports from UEs that it is serving (block 707). The SNR report from each UE may report to the NB the UE's preferred beam, i.e., the beam with the highest received transmit power. The UE may make this decision without consideration given to received interference power. Alternatively, the SNR report from each UE may report to the NB several beams. For example, the UE may report m beams, wherein the m beams have the m highest received transmit power.

From the received SNR reports, the NB may be able to determine its beam cycle pattern (block 709). For example, the NB may select beams that are reported as beams with the highest received transmit power by the most UEs for its beam cycle pattern. The NB may utilize one or more of the techniques described previously to select beams for its beam cycle pattern. Receiving SNR reports from the UEs (block 707) and determining the beam cycle pattern (block 709) may be part of stage one slow beam selection of UE scheduling. Stage one slow beam selection may occur periodically with a relatively long period, such as on the order of seconds.

With stage one slow beam selection complete, the NB may begin transmitting beams according to its beam cycle pattern and stage two fast user selection may begin. Stage two fast user selection may begin with the NB receiving CQI reports from the UEs that it is serving (block 711). According to an embodiment, the CQI reports from the UEs may contain information for m preferred beams, where m is a non-zero positive integer value. Preferably, m may start at a value of one (1).

The UEs may compute the CQI to report to the NB by measuring a SINR of the communications channel for the various beams transmitted by the NB during its beam cycle period. Since the beam cycle patterns of the NBs operating in coordinated beam switching have been set in stage one slow beam selection, the UEs may take into consideration interference from neighboring cells.

With the received CQI reports from the UEs, the NB may check to determine if there are any dead beams (block 713). As described previously, a dead beam may be a beam in the NB's beam cycle period that is not reported as a preferred beam (or any of the m preferred beams) by the UEs served by the NB. A beam may become a dead beam from several reasons. A first reason may be that there are no UEs operating in an area covered by the beam. A second reason may be that there is significant interference from neighboring cells while the beam is being transmitted.

If there are no dead beams present, the NB may not need to make any adjustments and it may schedule UEs to resources based on the reported CQI from the UEs (block 715). The NB may use any of a variety of scheduling techniques discussed previously, such as round robin, proportional fair, maximum throughput, and so forth, to schedule the UEs. Once the UEs are scheduled, NB operations 700 may then terminate.

If there are dead beams present, the NB may increment a number of beam CQIs that each UE is to report in its CQI report, i.e., the NB may increment m (block 717). By increasing m, the NB may receive additional information regarding beams in its beam cycle pattern and potentially be able to more efficiently schedule UEs. The NB may then return to block 711 to receive additional CQI reports from the UEs.

Figure 7B:
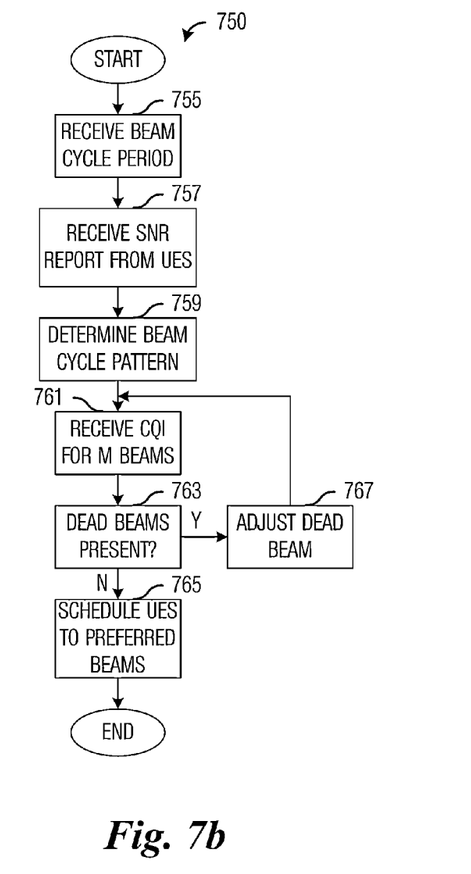
FIG. 7b is a flow diagram of NB operations for UE scheduling with fractional frequency reuse.

FIG. 7b illustrates a flow diagram of NB operations 750 for UE scheduling with fractional frequency reuse. NB operations 750 may be indicative of operations occurring in a NB as it schedules UEs using a two-stage scheduler with fractional frequency reuse.

Fractional frequency reuse may involve the use of only a fraction (i.e., a portion) of a total amount of bandwidth available to a NB so that interference to other NBs operating in the area may be reduced. If a sufficient number of NBs operating in the area using fractional frequency reuse, the interference caused to neighboring cells may be reduced.

NB operations 750 may begin with the NB receiving a beam cycle period from a controller, such as a cluster controller that may be used to control operations of NBs participating in coordinated beam switching (block 755). The beam cycle period may be a period of a beam cycle pattern of beams to be transmitted by the NB. Each NB participating in coordinated beam switching may have a beam cycle pattern of the same beam cycle period. However, the beams transmitted by the individual NBs and an ordering of the beams themselves may differ between the individual NBs.

Once the NB receives the beam cycle period from the cluster controller, the NB may begin to transmit its beams. For example, the NB may cycle through its available beams, perhaps in a random pattern or in sequence. The NB may then begin to receive SNR reports from UEs that it is serving (block 757). The SNR report from each UE may report to the NB the UE's preferred beam, i.e., the beam with the highest received transmit power. The UE may make this decision without consideration given to received interference power. Alternatively, the SNR report from each UE may report to the NB several beams. For example, the UE may report m beams, wherein the m beams have the m highest received transmit power.

From the received SNR reports, the NB may be able to determine its beam cycle pattern (block 759). For example, the NB may select beams that are reported as beams with the highest received transmit power by the most UEs for its beam cycle pattern. The NB may utilize one or more of the techniques described previously to select beams for its beam cycle pattern. Receiving SNR reports from the UEs (block 757) and determining the beam cycle pattern (block 759) may be part of stage one slow beam selection of UE scheduling. Stage one slow beam selection may occur periodically with a relatively long period, such as on the order of seconds.

With stage one slow beam selection complete, the NB may begin transmitting beams according to its beam cycle pattern and stage two fast user selection may begin. Stage two fast user selection may begin with the NB receiving CQI reports from the UEs that it is serving (block 761). According to an embodiment, the CQI reports from the UEs may contain information for m preferred beams, where m is a non-zero positive integer value. Preferably, m may start at a value of one (1).

The UEs may compute the CQI to report to the NB by measuring a SINR of the communications channel for the various beams transmitted by the NB during its beam cycle period. Since the beam cycle patterns of the NBs operating in coordinated beam switching have been set in stage one slow beam selection, the UEs may take into consideration interference from neighboring cells.

With the received CQI reports from the UEs, the NB may check to determine if there are any dead beams (block 763). As described previously, a dead beam may be a beam in the NB's beam cycle period that is not reported as a preferred beam (or any of the m preferred beams) by the UEs served by the NB. A beam may become a dead beam from several reasons. A first reason may be that there are no UEs operating in an area covered by the beam. A second reason may be that there is significant interference from neighboring cells while the beam is being transmitted.

If there are no dead beams present, the NB may not need to make any adjustments and it may schedule UEs to resources based on the reported CQI from the UEs (block 765). The NB may use any of a variety of scheduling techniques discussed previously, such as round robin, proportional fair, maximum throughput, and so forth, to schedule the UEs. Once the UEs are scheduled, NB operations 750 may then terminate.

If there are dead beams present, the NB may adjust the bandwidth of the dead beam(s) (block 767). According to an embodiment, one way that the NB may adjust the dead beam is to simply turn off the dead beam, i.e., not transmit anything while during time slots in the beam cycle pattern corresponding to the dead beam. Since no UEs have selected the dead beam, no UE throughput will be reduced and since the dead beam is no longer being transmitted, interference to neighboring cells may be reduced.

According to another embodiment, one way that the NB may adjust the dead beam is to reduce a bandwidth allocated to the dead beam, allocate the unallocated bandwidth to other beams in the beam cycle period, and then turn off the dead beam. In this embodiment, with the dead beam turned off, interference caused to neighboring cells is reduced. While the dead beam is turned off, a portion of the bandwidth previously allocated to the dead beam may be used in the transmission of other beams. The bandwidth previously allocated to the dead beam may then be used to transmit other beams, providing greater bandwidth to the UEs that have selected the other beams as their preferred beams. For example, the bandwidth may be reallocated to beams with heavier loads. The NB may then return to block 761 to receive additional CQI reports from the UEs.

According to an embodiment, the beams used in the beam cycle patterns may be from a predefined codebook, such as the predefined codebook in a LTE communications system. The UE may then determine its preferred beam(s) and report back a precoding matrix index (PMI) from the predefined codebook in place of the CQI. The reporting of the PMI may be similar to the reporting of a beam index based on SNR measurements as described previously. The PMI may be based on measurements from common pilots, which may lead to better channel estimation since common pilots do not change and the UE may effectively interpolate/average across time and frequency.

If the UE knows the beam cycling pattern, then the UE may be able to predict the SINR at a future time based on its preferred PMI and measured interference fluctuations (which are also periodic due to coordinated beam switching.

Furthermore, if the UE knows the beam cycling pattern and the predefined codebook in its own cell, then the precoding vector used in port 5 may be the precoding vector that will be used K switches ahead instead of the precoding vector currently being used for the physical data shared channel (PDSCH). The value of K must be known in the communications system. This may allow each UE an ability to measure a future interference situation and therefore, report a future CQI. Therefore, CQI delay problems due to the flashlight effect may be eliminated.

Additionally, if the UE knows the beam cycling pattern in its own cell (provided that the predefined codebook is used), then common pilots may be used for demodulation (together with the knowledge of the precoding vector) and the dedicated pilot on port 5 may therefore be switched off, thereby decreasing reference sequence overhead and potentially improving channel estimation performance since channel tracking may be used. Other cells may still measure CQI since the reference sequences used on port 5 are now precoded data instead of precoded pilots.

Figure 8:
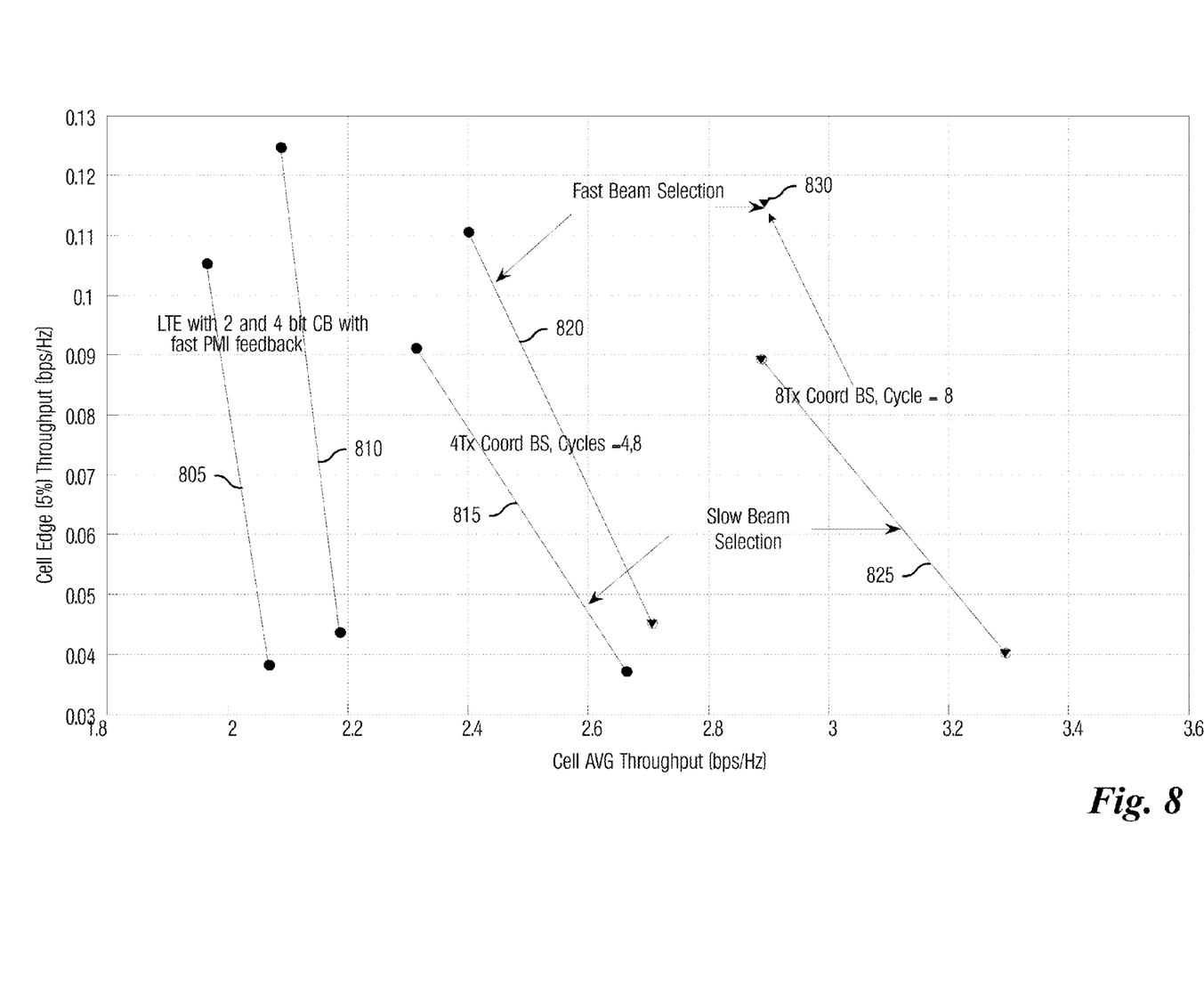
FIG. 8 is a data plot of system average throughput and average cell edge throughputs for scheduling using only slow beam selection and scheduling using fast beam selection.

FIG. 8 illustrates a data plot of system average throughput and average cell edge throughputs for scheduling using only slow beam selection and scheduling using fast beam selection. Each trace shown in FIG. 8 consists of two points, with a top point in a trace representing a load of 10 UEs per NB and a bottom point in a trace representing a load of 30 UEs per NB. A first trace 805 represents uncoordinated transmission performance with four transmit antenna and a two-bit codebook, while a second trace 810 represents uncoordinated transmission performance with four transmit antenna and a four-bit codebook. A third trace 815 represents coordinated beam switching performance with slow beam selection based only on SNR reports with four transmit antennas, and a fourth trace 820 represents coordinated beam switching performance with two-stage scheduling based on SNR reports in the first stage and SINR reports in the second stage with four transmit antennas. A fifth trace 825 represents coordinated beam switching performance with slow beam selection based only on SNR reports with eight transmit antennas, and triangle 830 represents coordinated beam switching performance with two-stage scheduling based on SNR reports in the first stage and SINR reports in the second stage with four transmit antennas. As shown in FIG. 8, for a case of eight transmit antennas and eight beams, a significant performance improvement is realized with fast beam selection. Similar performance improvement is also seen with a case of four transmit antennas and four beams.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controller operation, the method comprising:
   selecting beams for transmission in a beam cycle pattern, wherein the selecting is based on measurements of received signal power to noise made by a plurality of communications nodes;
   transmitting the selected beams in the beam cycle pattern;
   scheduling a subset of the plurality of communications nodes based on received transmissions for the subset of communications nodes and channel information reports from the plurality of communications nodes, wherein the channel information reports are based on measurements of received signal power plus received interference power to noise made by each of the plurality of communications nodes; and transmitting the received transmissions to the scheduled subset of the plurality of communications nodes.

2. The method of claim 1, wherein selecting beams comprises:
transmitting beamformed transmissions using a plurality of beam patterns, wherein a beam pattern used in beamforming the transmissions are changed once per transmission unit;
receiving information related to a first preferred beam pattern from each communications node in the plurality of communications nodes; and
determining beam patterns for transmission in a beam cycle pattern based on the received information.

3. The method of claim 2, wherein the received information from a communications node comprises an index corresponding to the communications node's first preferred beam pattern, and wherein a selection of the first preferred beam pattern is based on measurements of received signal power to noise in a transmission unit.

4. The method of claim 2, wherein determining beam patterns comprises:
generating a histogram of preferred beams from the received information; and
selecting beam patterns for the beam cycle pattern from beams most often selected as preferred beams by the plurality of communications nodes.

5. The method of claim 4, wherein selecting beam patterns comprises selecting the beam patterns based on a number of communications nodes preferring a beam and a number of times the beam appears in the beam cycle pattern.

6. The method of claim 4, wherein selecting beam patterns further comprises selecting the beam patterns based on a scaled number of communications nodes preferring a beam and a number of times the beam appears in the beam cycle pattern, wherein the number of communications nodes preferring a beam is scaled by an average receive signal power to noise ratio reported for the beam.

7. The method of claim 2, wherein the received information from a communications node comprises received signal power to noise measurements for each transmission unit for each beam, and wherein determining beam patterns comprises selecting beam patterns based on an average received signal power to noise measurement from each communications node.

8. The method of claim 1, wherein scheduling a subset of the plurality of communications nodes comprises:
receiving information related to a second preferred beam pattern from the plurality of communications nodes; and
scheduling transmissions to communications nodes based on the received information from the plurality of communications nodes and received transmissions for the subset of the communications nodes.

9. The method of claim 8, wherein the received information related to a second preferred beam pattern comprises an index corresponding to a communications node's second preferred beam pattern, and wherein a selection of the second preferred beam pattern is based on measurements of received signal power plus received interference power to noise in a transmission unit.

10. The method of claim 8, wherein scheduling transmissions comprises scheduling a transmission opportunity for a communications node in the subset of communications nodes if there are adequate network resources during a transmission unit corresponding to the communications node's second preferred beam.

11. The method of claim 8, wherein scheduling communications nodes further comprises:
detecting a beam pattern that is preferred by a small number or no communications nodes; and
adjusting the detected beam pattern.

12. The method of claim 11, wherein adjusting the detected beam pattern comprises not transmitting the detected beam pattern.

13. The method of claim 11, wherein adjusting the detected beam pattern comprises:
reducing a bandwidth allocation to the detected beam pattern; and
allocating additional bandwidth to remaining beam patterns.

14. The method of claim 1, wherein selecting beams for transmission occurs at a lower frequency than scheduling a subset of the plurality of communications nodes.

15. A method for communications node operation, the method comprising:
first measuring a communications channel between the communications node and a controller serving the communications node over a number of transmission units, thereby producing a first plurality of received signal power to noise ratio measurements, wherein transmissions from the controller are beamformed using a plurality of beam patterns, and wherein a beam pattern used in beamforming the transmissions are changed once per transmission unit;
selecting a first preferred measurement from the first plurality of measurements;
sending information related to the first preferred measurement to the controller;
second measuring the communications channel over the number of transmission units, thereby producing a second plurality of received signal power from the controller and received interference power from neighboring controllers to noise ratio measurements, and wherein transmissions from the controller are beamformed using a periodic beam cycle pattern;
selecting a second preferred measurement from the second plurality of measurements;
sending information related to the second preferred measurement to the controller; and
receiving a transmission from the controller during a transmission unit corresponding to the second preferred measurement.

16. The method of claim 15, wherein selecting a first preferred measurement comprises selecting a maximum received power to noise ratio from the first plurality of measurements.

17. The method of claim 16, wherein information related to the first preferred measurement comprises an index to a transmission unit of when a transmission corresponding to the first preferred measurement was made.

18. The method of claim 15, wherein selecting a first preferred measurement comprises selecting m largest measurements from the first plurality of measurements, where m is a positive integer value.

19. The method of claim 15, wherein selecting a second preferred measurement comprises selecting a maximum received signal power and received interference power to noise ratio from the second plurality of measurements.

20. The method of claim 15, wherein selecting a second preferred measurement comprises selecting m largest received signal power plus received interference power to noise ratio from the second plurality of measurements, where m is a positive integer value.

21. A communications controller configured to operate in a cooperative beam switching mode, the communications controller comprising:
- a processor configured to execute programs and applications;
- a transmit and receive circuit coupled to the processor and to an antenna, the transmit and receive circuit configured to process received transmissions and to prepare transmissions for transmission;
- a scheduler coupled to the processor, the scheduler configured to
  - receive a period for a beam cycle pattern from a central controller;
  - select beams for transmission in the beam cycle pattern based on received signal power to noise ratio measurements from a plurality of communications nodes;
  - transmit the selected beams in the beam cycle pattern; and
  - schedule transmissions to the communications nodes based on received transmissions from the communications nodes and on channel information reports from the communications nodes, wherein the channel information reports are based on measurements of received signal power plus received interference power to noise made by each of the communications nodes; and
- a memory coupled to the processor, the memory to store applications, programs, and scheduling information.

22. The communications controller of claim 21, wherein the scheduler is configured to perform the select beams more frequently than the schedule transmissions.

23. The communications controller of claim 21, wherein the scheduler configured to select beams comprises the scheduler configured to:
- transmit beamformed transmissions using a plurality of beam patterns, wherein a beam pattern used in beamforming the transmissions are changed once per transmission unit;
- receive information related to a first preferred beam pattern from each of the communications nodes; and
- determine beam patterns for transmission in a beam cycle pattern based on the received information.

24. The communications controller of claim 23, wherein the received information from each of the communications nodes comprises an index corresponding to a respective communications node's first preferred beam pattern, and wherein the scheduler is configured to select the first preferred beam pattern based on measurements of received signal power to noise in a transmission unit.

25. The communications controller of claim 23, wherein the scheduler configured to determine beam patterns comprises the scheduler configured to:
- generate a histogram of preferred beams from the received information; and
- select beam patterns for the beam cycle pattern from beams most often selected as preferred beams by the communications nodes.

26. The communications controller of claim 23, wherein the received information from each of the communications nodes comprises received signal power to noise measurements for each transmission unit for each beam, and wherein the scheduler configured to determine beam patterns comprises the scheduler configured to select beam patterns based on an average received signal power to noise measurement from each of the communications nodes.

27. The communications controller of claim 21, wherein the scheduler configured to schedule transmissions to the communications nodes comprises the scheduler configured to:
- receive information related to a second preferred beam pattern from the communications nodes; and
- schedule transmissions to the communications nodes based on the received information from the communications nodes and received transmissions from the communications nodes.

28. The communications controller of claim 27, wherein the received information related to a second preferred beam pattern comprises an index corresponding to a respective communications node's second preferred beam pattern, and wherein the scheduler is configured to select the second preferred beam pattern based on measurements of received signal power plus received interference power to noise in a transmission unit.

29. The communications controller of claim 27, wherein the scheduler configured to schedule transmissions to the communications nodes comprises the scheduler configured to schedule a transmission opportunity for one of the communications nodes when there are adequate network resources during a transmission unit corresponding to the one communications node's second preferred beam.

30. The communications controller of claim 27, wherein the scheduler configured to schedule transmissions to the communications nodes further comprises the scheduler configured to:
- detect a beam pattern that is preferred by a small number or none of the communications nodes; and
- adjust the detected beam pattern.

* * * * *